United States Patent
Brobston et al.

(10) Patent No.: US 7,369,873 B2
(45) Date of Patent: May 6, 2008

(54) APPARATUS AND METHOD FOR REMOTELY MODIFYING RECONFIGURABLE HARDWARE IN A MOBILE STATION

(75) Inventors: Michael L. Brobston, Allen, TX (US); Weon-Ki Yoon, Plano, TX (US); William M. Hurley, Wylie, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 617 days.

(21) Appl. No.: 11/055,030

(22) Filed: Feb. 10, 2005

(65) Prior Publication Data

US 2005/0202841 A1    Sep. 15, 2005

Related U.S. Application Data

(60) Provisional application No. 60/551,687, filed on Mar. 10, 2004.

(51) Int. Cl.
*H04Q 7/20* (2006.01)
*H04Q 7/32* (2006.01)

(52) U.S. Cl. .............. 455/552.1; 455/550.1; 455/553.1; 455/422.1; 455/432.1; 455/414.01; 455/551; 455/403; 370/328; 370/338

(58) Field of Classification Search ............ 455/552.1, 455/553.1, 550.1, 432.1, 432.2, 433, 434, 455/435.1, 435.2, 551, 435.3, 422.1, 403, 455/414.1, 414.2, 426.1, 426.2, 500, 517, 455/412.1, 412.2, 418, 419, 420, 515, 73, 455/575.1, 557; 370/328, 338, 342, 310

See application file for complete search history.

(56) References Cited

U.S. PATENT DOCUMENTS

| | | | |
|---|---|---|---|
| 2001/0036827 A1* | 11/2001 | Edlund et al. | 455/432 |
| 2003/0078037 A1* | 4/2003 | Auckland et al. | 455/422 |
| 2003/0143988 A1* | 7/2003 | Jamadagni | 455/418 |
| 2004/0022216 A1* | 2/2004 | Shi | 370/335 |
| 2005/0148332 A1* | 7/2005 | Buckley et al. | 455/435.2 |

* cited by examiner

*Primary Examiner*—Keith Ferguson (57) ABSTRACT

A multi-mode mobile station comprising 1) reconfigurable transceiver circuitry for communicating with wireless networks operating under different air interface standards; 2) a memory for storing at least a download configuration file and a home configuration file; and 3) a main controller for configuring the reconfigurable transceiver circuitry to operate according to a home network wireless standard using home configuration data retrieved from the home configuration file. If the main controller determines that a network operating according to the home network wireless standard cannot be found, the main controller is further capable of configuring the reconfigurable transceiver circuitry to operate according to a download channel wireless standard using download configuration data retrieved from the download configuration file. The main controller then establishes a download channel with a local roaming wireless network and downloads a roaming network configuration file from the roaming wireless network over the download channel.

20 Claims, 8 Drawing Sheets

APPARATUS AND METHOD FOR REMOTELY MODIFYING RECONFIGURABLE HARDWARE IN A MOBILE STATION

CROSS-REFERENCE TO RELATED APPLICATIONS

The present invention is related to that disclosed in U.S. Provisional Patent Application Ser. No. 60/551,687, filed Mar. 10, 2004, entitled "Method for Remotely Modifying Reconfigurable Hardware for Software Defined Radio Signal Processing". U.S. Provisional Patent Application Ser. No. 60/551,687 is assigned to the assignee of the present application. The subject matter disclosed in U.S. Provisional Patent Application Ser. No. 60/551,687 is hereby incorporated by reference into the present disclosure as if fully set forth herein. The present invention hereby claims priority under 35 U.S.C. §119(e) to U.S. Provisional Patent Application Ser. No. 60/551,687.

TECHNICAL FIELD OF THE INVENTION

The present invention relates generally to wireless networks and, more specifically, to a multi-mode, reconfigurable digital transceiver for use in a multi-mode mobile station that communicates with wireless networks operating under different standards.

BACKGROUND OF THE INVENTION

Recent years have seen the deployment of a variety of different access standards for use in wireless networks (e.g., GSM, CDMA, WCDMA, IEEE-801.16, etc.). However, the proliferation of wireless access standards has proven to be inconvenient and challenging for the manufacturers of wireless mobile stations (or terminal), such as cell phones, PDA devices, wireless laptops, and the like. End-user expectations of a ubiquitous network cannot be met with mobile stations that support only a subset of the possible standards.

In response, wireless mobile stations are transitioning to software-defined radio (SDR) architectures to provide common hardware platforms for multiple air interface technologies. The continual improvement of semiconductor process technology has enabled an increasingly greater percentage of the signal processing functions in a mobile station (or wireless terminal) to be performed by reconfigurable hardware. The reconfigurable hardware may take one of several forms, including fixed functional blocks with customizable parameters and flexible interconnects. The reconfigurable hardware may be implemented, for example, in a field-programmable gate array (FPGA).

While fully configurable devices such as field programmable gate arrays currently have issues related to power and cost, the evolution in process and architecture technology is likely to overcome these limitations in time. However, within a software-refined radio (SDR) system, it is expensive and wasteful to store in memory all of the possible configuration files that the mobile station is likely to need.

To avoid such large memories, a user may transport the mobile station to a wireless service center and have the mobile station configuration software installed through cabling when needed. As users travel from one geographical region to another region that is served by a different wireless standard, a similar paradigm of reconfiguration for hardware is frustrating to the user and costly to wireless service providers.

Therefore, there is a need in the art for a multi-mode mobile station that is capable of being reconfigured to operate according to a variety of air interface standards. More particularly, there is a need for a multi-mode mobile station that does not require a large memory of storing a large number of configuration files.

SUMMARY OF THE INVENTION

The present invention provides a multi-mode mobile station capable of being remotely configured to communicate in diverse wireless networks operating under different air interface standards (e.g., CDMA, WCDMA, GSM, etc.). The present invention also provides a method of remotely delivering and verifying SDR configuration files and automatically executing a reconfiguration of the reconfigurable hardware of the multi-mode mobile station. The multi-mode mobile station receives its signal processing configuration from a centralized controller (i.e., a server) when needed. This eliminates the need for the mobile station to store and maintain the multiple radio configurations to which it may be set, but still allows the mobile station to support the many standards required by user demands. Advantageously, a mobile station according to the principles of the present invention may be reconfigured remotely with little or no user or service provider intervention.

To address the above-discussed deficiencies of the prior art, it is a primary object of the present invention to provide a multi-mode mobile station. According to an advantageous embodiment of the present invention, the multi-mode mobile station comprises: 1) reconfigurable transceiver circuitry capable of communicating with wireless networks operating under different air interface standards; 2) a memory for storing at least a download configuration file and a home configuration file; and 3) a main controller capable of configuring the reconfigurable transceiver circuitry to operate according to a home network wireless standard using home configuration data retrieved from the home configuration file. The main controller is further capable of determining that a network operating according to the home network wireless standard cannot be found. The main controller, in response to that determination, is further capable of configuring the reconfigurable transceiver circuitry to operate according to a download channel wireless standard using download configuration data retrieved from the download configuration file.

According to one embodiment of the present invention, the main controller is capable of validating the download configuration data.

According to another embodiment of the present invention, the main controller is further capable of establishing a download channel with a roaming wireless network capable of operating according to the download channel wireless standard.

According to still another embodiment of the present invention, the main controller is further capable of downloading a roaming network configuration file over the download channel from the roaming wireless network.

According to another embodiment of the present invention, the main controller is further capable of configuring the reconfigurable transceiver circuitry to operate according to a roaming wireless standard using roaming configuration data retrieved from the downloaded roaming network configuration file.

According to a further embodiment of the present invention, the main controller is capable of validating the roaming configuration data.

According to a still further embodiment of the present invention, the download channel wireless standard operates in unlicensed radio frequency spectrum.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless mobile station.

Figure 1:
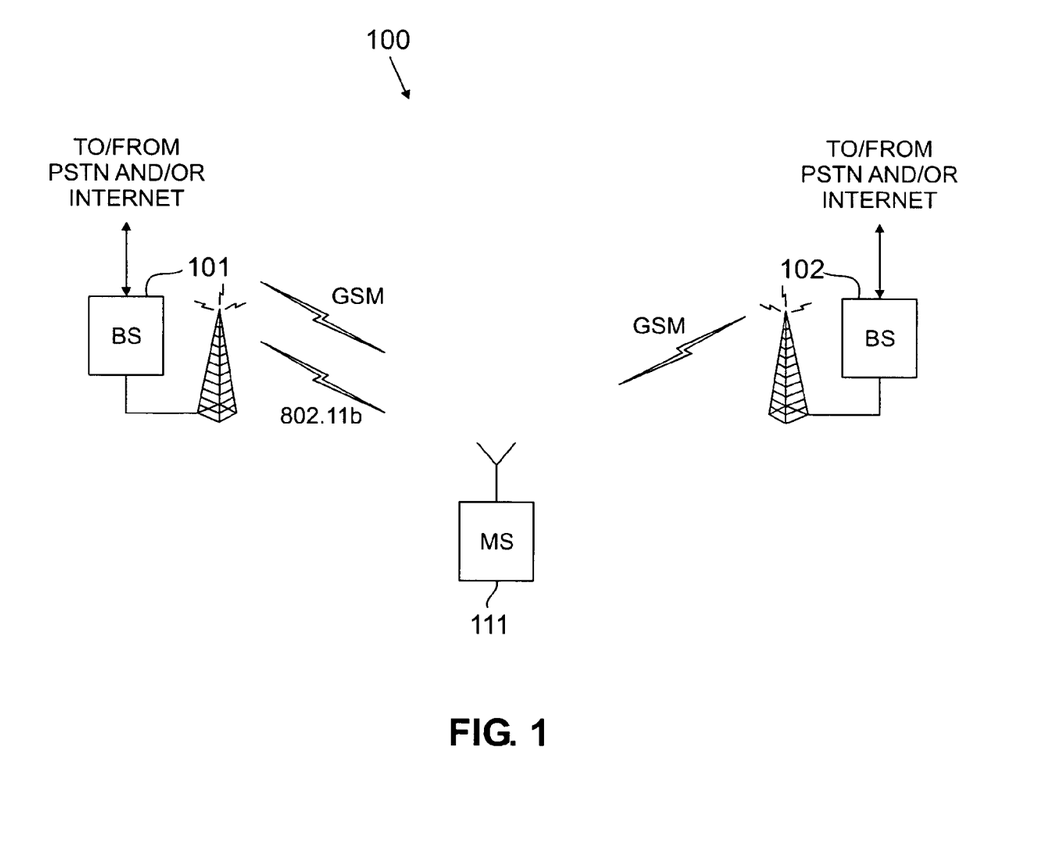
FIG. 1 illustrates a wireless network in which a multi-mode mobile station may be remotely configured to communicate with base stations operating under different air interface standards according to the principles of the present invention.

FIG. 1 illustrates wireless network 100, in which multi-mode mobile station (MS) 111 may be remotely configured to communicate with base stations 101 and 102 operating under different air interface standards (or wireless network standards) according to the principles of the present invention. In FIG. 1, it is assumed multi-mode MS 111 is roaming in wireless network 100. Multi-mode MS 111 normally operates in a home network (not shown) under a first air interface standard (or a "home" network wireless standard). In this example, it is assumed that multi-mode MS 111 operates under the CDMA standard in its home network. In its home network, multi-mode MS 111 uses a home configuration file to set-up the re-configurable hardware within multi-mode MS 111 to communicate under the CDMA standard with its home network.

However, when multi-mode MS 111 enters wireless network 100, multi-mode MS 111 is roaming and cannot use its home configuration file. In this example, it is assumed that wireless network 100 normally operates under a second air interface standard (or a "roaming" network wireless standard) that is different than the first air interface standard in the home network of multi-mode MS 111. In particular, it shall be assumed that wireless network 100 operates under the GSM standard.

However, it is further assumed that at least some of the base stations (e.g., BS 101) of wireless network 100 are also capable of communicating with mobile stations using a third air interface standard (or a "download channel" wireless standard). In particular, it shall be assumed that BS 101 of wireless network 100 is also capable of operating under the IEEE-802.11b standard or a similar unlicensed standard. The IEEE-802.11b standard is a common technology that is well-known and low cost. Advantageously, since the IEEE-802.11b standard operates in unlicensed radio frequency (RF) spectrum, the service provider operating wireless network 100 can download hardware configurations to multi-mode MS 111 without using the expensive, licensed spectrum of the GSM standard.

In order to communicate with wireless network 100, multi-mode MS 111 must obtain a roaming configuration file that can be used to reconfigure multi-mode MS 111 to communicate with wireless network 100 according to the GSM standard. According to the principles of the present invention, multi-mode MS 111 accomplishes this by communicating with BS 101 of wireless network using the unlicensed download channel wireless standard, in this case the IEEE-802.11b standard. Multi-mode MS 111 accesses a central server via BS 101 using the IEEE-802.11b channel(s) and then downloads a roaming configuration file. Once downloaded, the roaming configuration file is used to reconfigure multi-mode MS 111 so that multi-mode MS 111 is able to communicate under the GSM standard with any base station of wireless network 100.

The present invention is not limited to use with truly mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and a stationary wireless terminal (e.g., a machine monitor with wireless capability) that may be moved and then turned on (or activated) for the first time in a new area that is covered by a wireless network that uses a different air interface standard than the wireless network in which the stationary wireless terminal previously operated.

Figure 2:
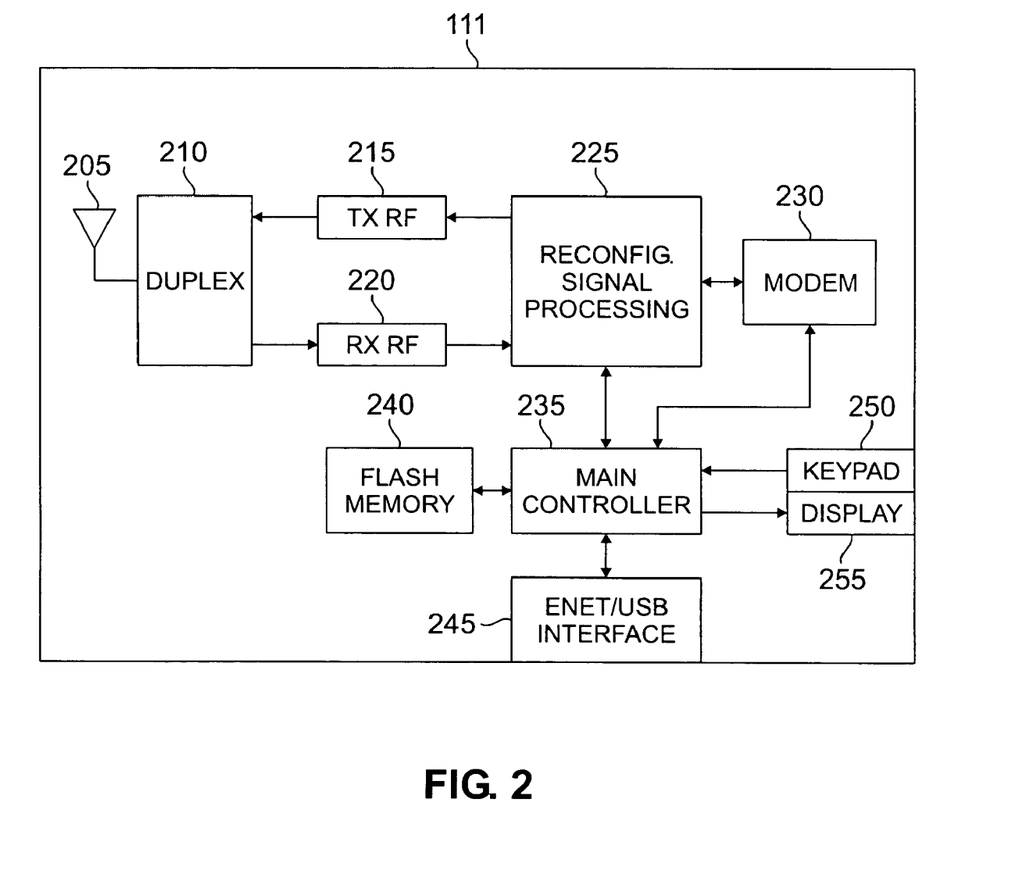
FIG. 2 is a high-level block diagram illustrating a multi-mode mobile station according to an exemplary embodiment of the present invention.

FIG. 2 is a high-level block diagram illustrating multi-mode mobile station (MS) 111 according to an exemplary embodiment of the present invention. Multi-mode MS 111 comprises antenna 205, duplexer 210, transmit (TX) radio-frequency (RF) block 215, receive (RX) radio-frequency (RF) block 220, reconfigurable signal processing block 225, reconfigurable modem 230, main controller 235, non-volatile (i.e., Flash) memory 240, ENET/USB interface 245, keypad 250 and display 255. According to an exemplary embodiment of the present invention, modem 230 may be implemented by software-defined radio SSDR) device that is reconfigured by means of a new software load. Moreover, main controller 235 may be implemented by means of a general-purpose processor that executes a control program (not shown) stored in memory 240.

According to the principles of the present invention, reconfigurable signal processing block 225 is capable of operating under multiple air interface standards through the use of configuration data retrieved from configuration files stored in memory 240. In an exemplary embodiment of the present invention, reconfigurable signal processing block 225 may be implemented by a field-programmable gate array (FPGA). Alternatively, an application-specific integrated circuit (ASIC) may be used.

Main controller 235 controls the overall operation of multi-mode MS 111. Main controller 235 is capable of executing end-user applications stored in memory 240, such as web-browser applications, e-mail applications, voice data, and the like. Main controller 235 receives user input from keypad 250 and displays graphics and data on display 255. If required, main controller 235 may communicate over a wireline with external devices via ENET/USB interface 245. This may include downloading configuration files into memory 240 using ENET/USB interface 245.

In the forward channel (or downlink), incoming RF signals received by antenna 205 are transferred by duplexer 210 to receive RF block 220. Receive RF block 220 down-converts the received RF signal to produce an intermediate frequency (IF) signal. Reconfigurable signal processing block 225 then down-converts the IF signal according to the selected air interface standard to produce a baseband signal. Modem 230 then demodulates the baseband signal to produce the user data (including voice data) for the end-user application.

In the reverse channel (or uplink), modem 230 modulates outgoing user data to produce a baseband signal. Reconfigurable signal processing block 225 then up-converts the baseband signal according to the selected air interface standard to produce an outgoing intermediate frequency (IF) signal. Transmit RF block 215 then up-converts the outgoing IF signal to produce an outgoing RF signal. Duplexer 210 then directs the outgoing RF signal to antenna 205.

FIGS. 3-6 below illustrate exemplary configurations of reconfigurable signal processing block 225 according to several common air interface standards. These common air interface standards include wideband WCDMA, CDMA, IEEE-802.11b, and GSM.

Figure 3A:
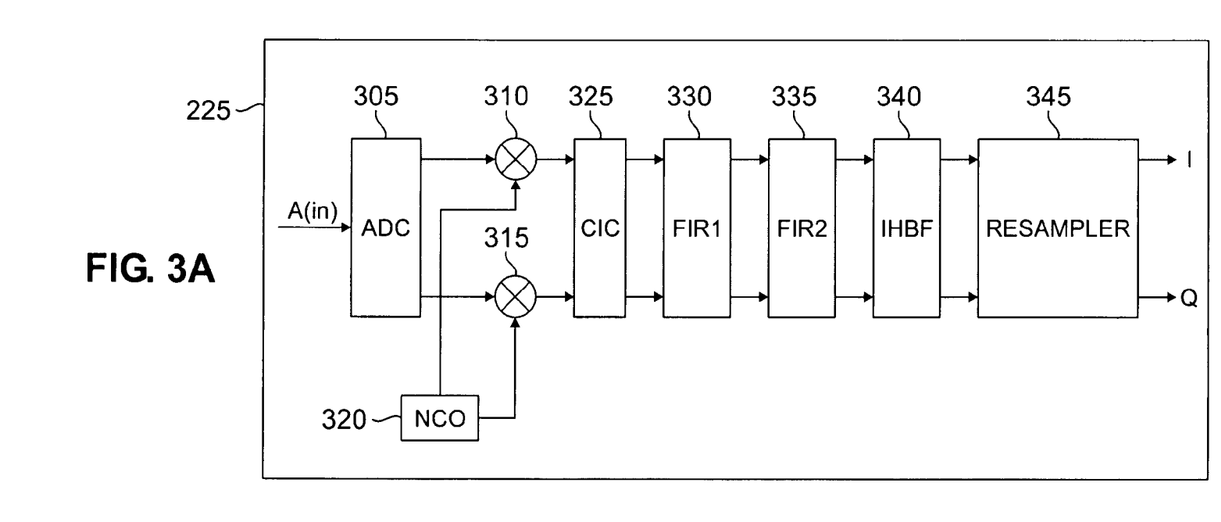
FIGS. 3A and 3B illustrate in greater detail selected portions of the reconfigurable signal processing block in the multi-mode mobile station in FIG. 2 according to a first embodiment of the present invention.
Figure 3B:
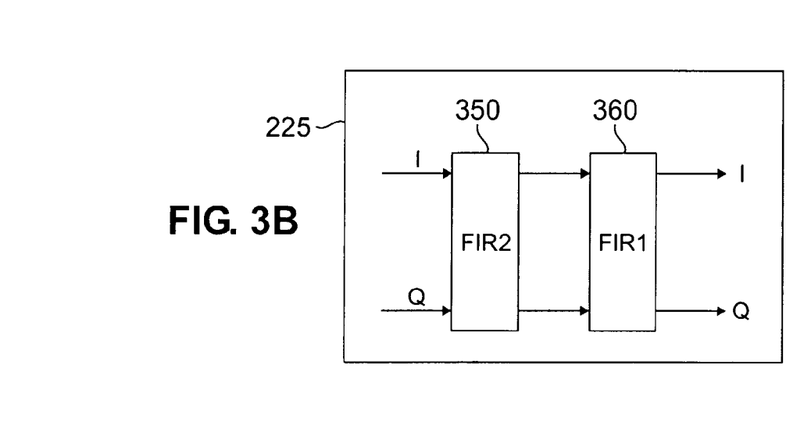

FIGS. 3A and 3B illustrate in greater detail selected portions of reconfigurable signal processing block 225 in multi-mode mobile station (MS) 111 according to a first embodiment of the present invention. FIG. 3A illustrates selected portions of the receive path of reconfigurable signal processing block 225 during WCDMA operation. FIG. 3B illustrates selected portions of the transmit path of reconfigurable signal processing block 225 during WCDMA operation.

The receive path of reconfigurable signal processing block 225 comprises analog-to-digital converter (ADC) 305, in-phase (I) mixer 310, quadrature (Q) mixer 315, numerically-controlled oscillator (NCO) 320, cascaded integrator/comb (CIC) filter stage 325, finite impulse response (FIR1) filter stage 330, finite impulse response (FIR2) filter stage 335, interpolation half-band filter 340, and resampler 345. The receive path of reconfigurable signal processing block 225 in FIG. 3A receives the IF signal, A(in), from receive RF block 220 and produces the digital baseband I and Q signals.

The transmit path of reconfigurable signal processing block 225 comprises finite impulse response (FIR2) filter stage 350 and finite impulse response (FIR1) filter stage 360. The transmit path of reconfigurable signal processing block 225 in FIG. 3B receives digital baseband I and Q signals from modem 230 and produces digital filtered I and Q signals according to the channel filter specification of the standard. The WCDMA operation of both the receive path and the transmit path of reconfigurable signal processing block 225 is controlled by configuration data retrieved from memory 240 that configures the hardware of reconfigurable signal processing block 225.

Figure 4A:
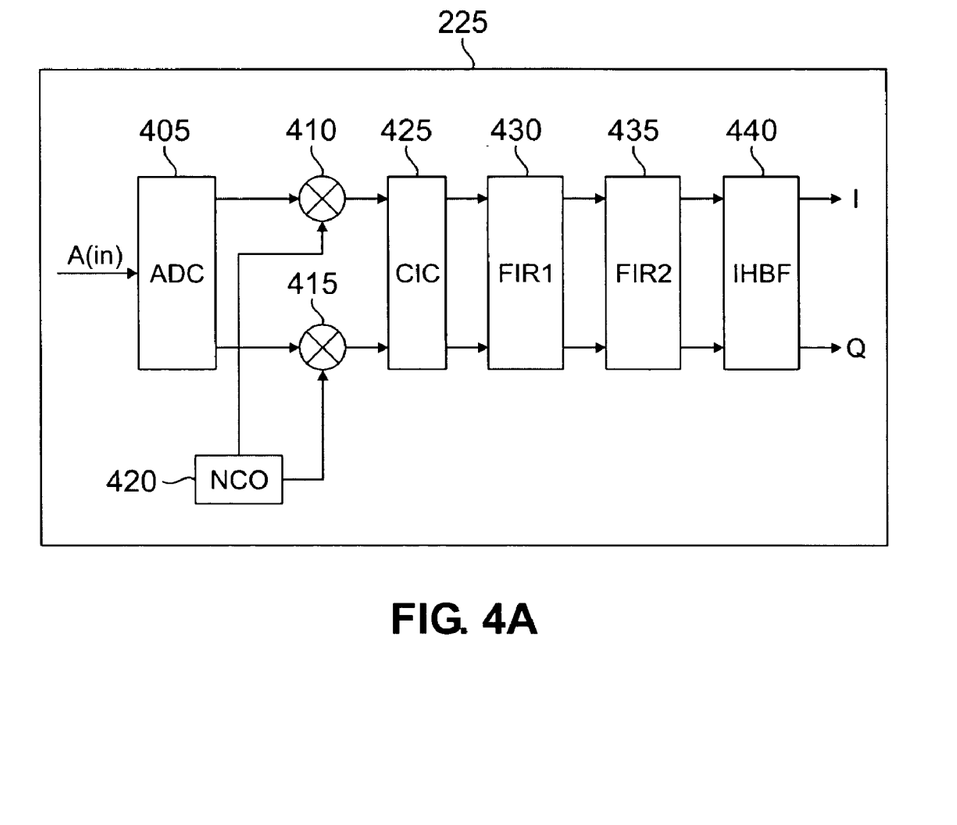
FIGS. 4A and 4B illustrate in greater detail selected portions of the reconfigurable signal processing block in the multi-mode mobile station in FIG. 2 according to a second embodiment of the present invention.
Figure 4B:
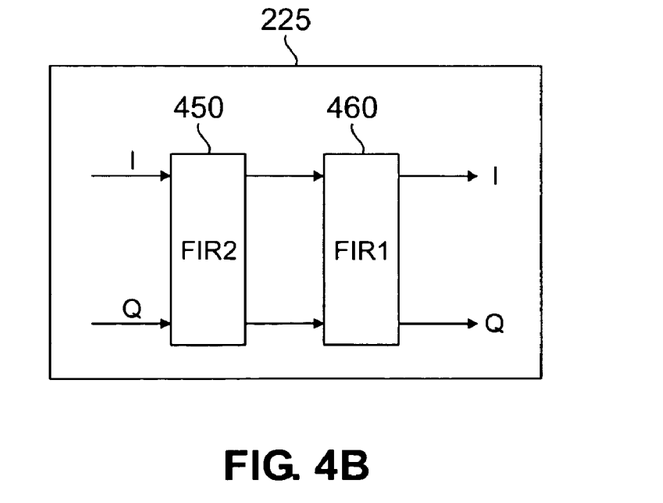

FIGS. 4A and 4B illustrate in greater detail selected portions of reconfigurable signal processing block 225 in multi-mode mobile station (MS) 111 according to a second embodiment of the present invention. FIG. 4A illustrates selected portions of the receive path of reconfigurable signal processing block 225 during CDMA operation. FIG. 4B illustrates selected portions of the transmit path of reconfigurable signal processing block 225 during CDMA operation.

The receive path of reconfigurable signal processing block 225 comprises analog-to-digital converter (ADC) 405, in-phase (I) mixer 410, quadrature (Q) mixer 415, numerically-controlled oscillator (NCO) 420, cascaded integrator/comb (CIC) filter stage 425, finite impulse response (FIR1) filter stage 430, finite impulse response (FIR2) filter stage 435, and interpolation half-band filter 440. The receive path of reconfigurable signal processing block 225 in FIG. 4A receives the IF signal, A(in), from receive RF block 220 and produces the digital baseband I and Q signals.

The transmit path of reconfigurable signal processing block 225 comprises finite impulse response (FIR2) filter stage 450 and finite impulse response (FIR1) filter stage 460. The transmit path of reconfigurable signal processing block 225 in FIG. 4B receives digital baseband I and Q signals from modem 230 and produces digital filtered I and Q signals according to the channel filter specification of the standard. The CDMA operation of both the receive path and the transmit path of reconfigurable signal processing block 225 is controlled by configuration data retrieved from memory 240 that configures the hardware of reconfigurable signal processing block 225.

Figure 5A:
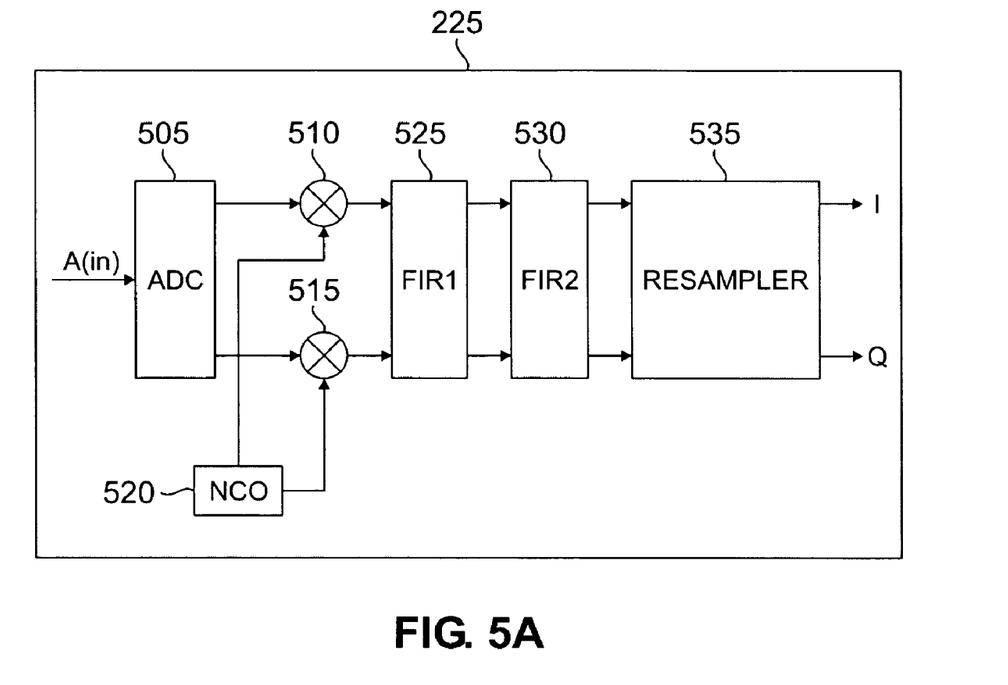
FIGS. 5A and 5B illustrate in greater detail selected portions of the reconfigurable signal processing block in the multi-mode mobile station in FIG. 2 according to a third embodiment of the present invention.
Figure 5B:
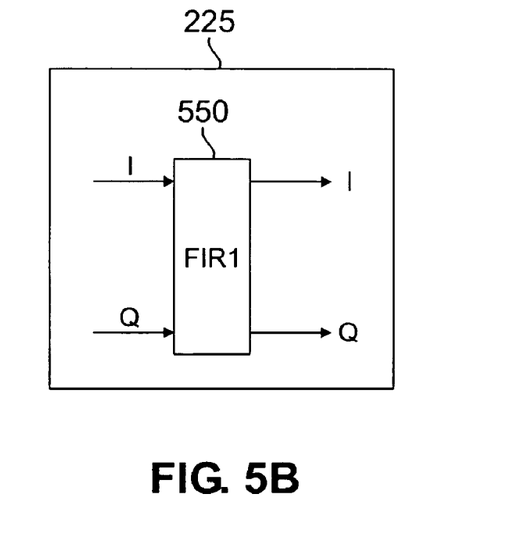

FIGS. 5A and 5B illustrate in greater detail selected portions of reconfigurable signal processing block 225 in multi-mode mobile station (MS) 111 according to a third embodiment of the present invention. FIG. 5A illustrates selected portions of the receive path of reconfigurable signal processing block 225 during IEEE-802.11b operation. FIG. 5B illustrates selected portions of the transmit path of reconfigurable signal processing block 225 during IEEE-802.11b operation.

The receive path of reconfigurable signal processing block 225 comprises analog-to-digital converter (ADC) 505, in-phase (I) mixer 510, quadrature (Q) mixer 515, numerically-controlled oscillator (NCO) 520, finite impulse response (FIR1) filter stage 525, finite impulse response (FIR2) filter stage 530, and resampler 535. The receive path of reconfigurable signal processing block 225 in FIG. 5A receives the IF signal, A(in), from receive RF block 220 and produces the digital baseband I and Q signals.

The transmit path of reconfigurable signal processing block 225 comprises finite impulse response (FIR1) filter stage 550. The transmit path of reconfigurable signal processing block 225 in FIG. 5B receives digital baseband I and Q signals from modem 230 and produces digital filtered I and Q signals according to the channel filter specification of the standard. The IEEE-802.11b operation of both the receive path and the transmit path of reconfigurable signal processing block 225 is controlled by configuration data retrieved from memory 240 that configures the hardware of reconfigurable signal processing block 225.

Figure 6A:
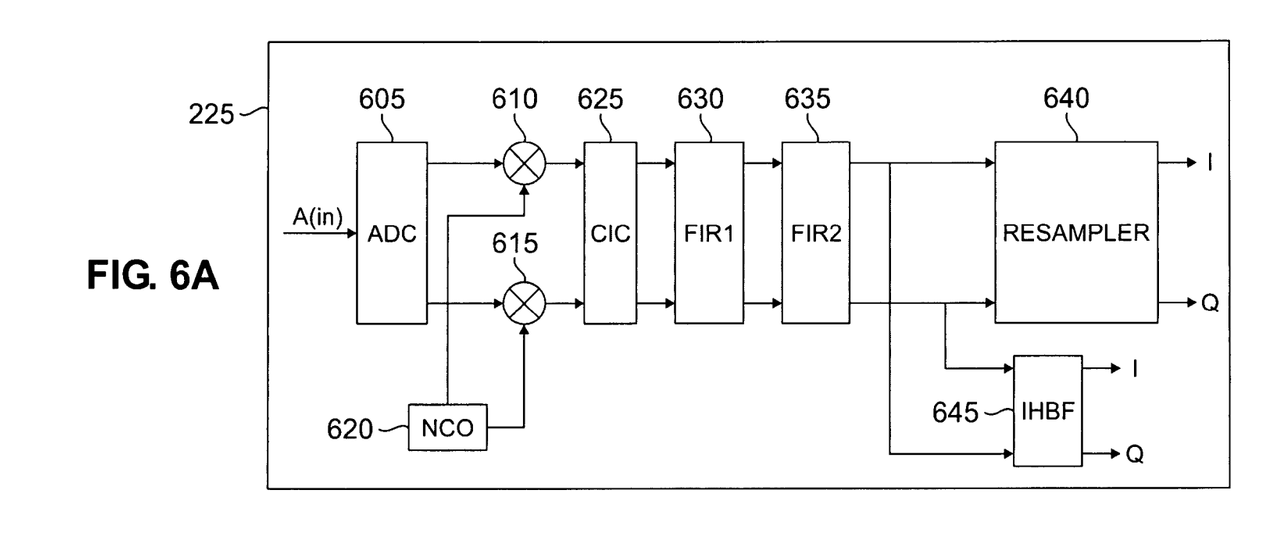
FIGS. 6A and 6B illustrate in greater detail selected portions of the reconfigurable signal processing block in the multi-mode mobile station in FIG. 2 according to a first embodiment of the present invention.
Figure 6B:
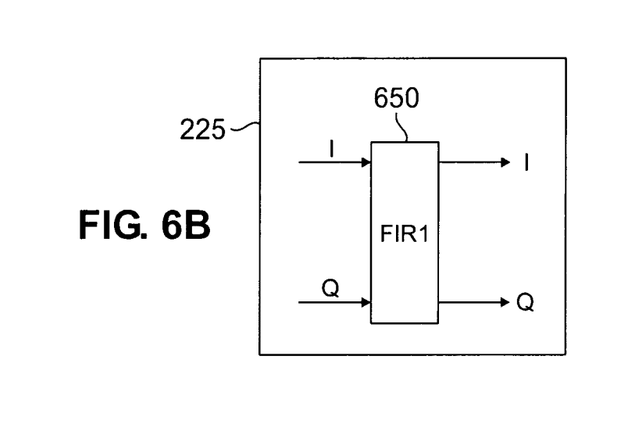

FIGS. 6A and 6B illustrate in greater detail selected portions of reconfigurable signal processing block 225 in multi-mode mobile station (MS) 111 according to a first embodiment of the present invention. FIG. 6A illustrates selected portions of the receive path of reconfigurable signal processing block 225 during GSM operation. FIG. 6B illustrates selected portions of the transmit path of reconfigurable signal processing block 225 during GSM operation.

The receive path of reconfigurable signal processing block 225 comprises analog-to-digital converter (ADC) 605, in-phase (I) mixer 610, quadrature (Q) mixer 615, numerically-controlled oscillator (NCO) 620, cascaded integrator/comb (CIC) filter stage 625, finite impulse response (FIR1) filter stage 630, finite impulse response (FIR2) filter stage 635, interpolation half-band filter 645, and resampler 640. The receive path of reconfigurable signal processing block 225 in FIG. 6A receives the IF signal, A(in), from receive RF block 220 and produces the digital baseband I and Q signals.

The transmit path of reconfigurable signal processing block 225 comprises finite impulse response (FIR1) filter stage 650. The transmit path of reconfigurable signal processing block 225 in FIG. 6B receives digital baseband I and Q signals from modem 230 and produces filtered I and Q signals according to the channel filter specification of the standard. The GSM operation of both the receive path and the transmit path of reconfigurable signal processing block 225 is controlled by configuration data retrieved from memory 240 that configures the hardware of reconfigurable signal processing block 225.

Figure 7:
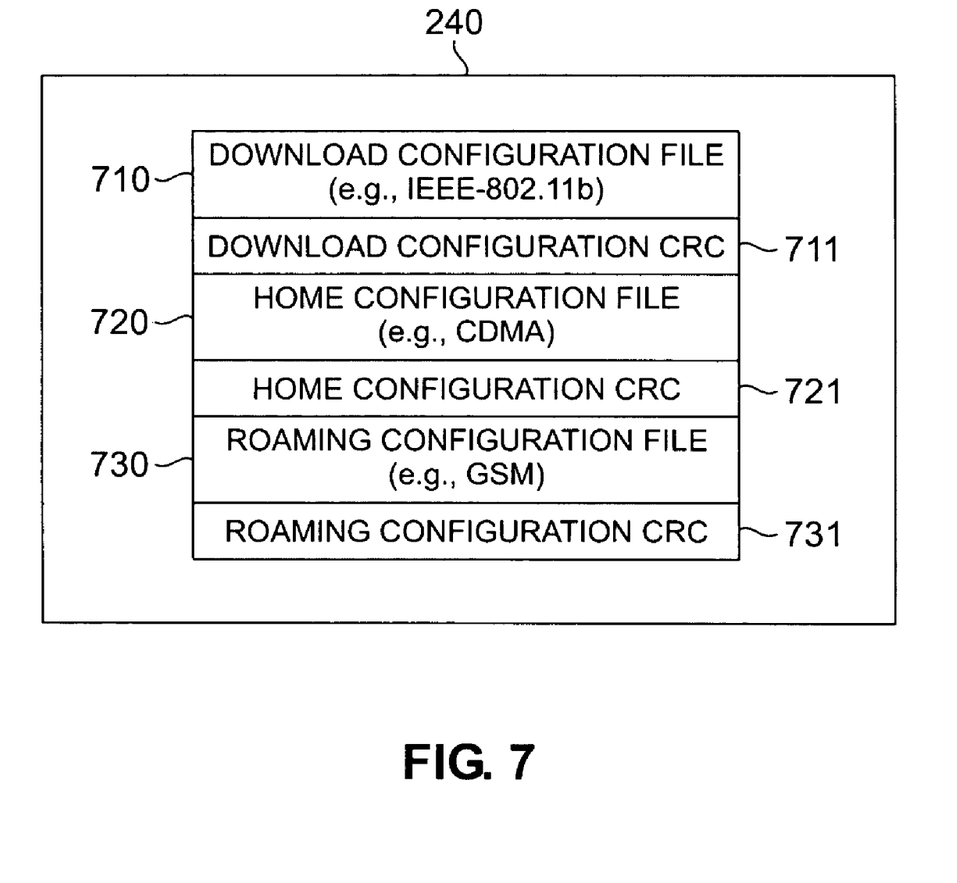
FIG. 7 illustrates exemplary configuration files in the memory of the multi-mode mobile station in FIG. 2.

FIG. 7 illustrates exemplary configuration files in memory 240 of multi-mode mobile station (MS) 111. Memory 240 comprises download configuration file 710, download configuration cyclic redundancy check (CRC) value 711, home configuration file 720, home configuration cyclic redundancy check (CRC) value 721, roaming configuration file 730, and roaming configuration cyclic redundancy check (CRC) value 731. Download configuration CRC value 711 is used to verify the configuration data in download configuration file 710. Home configuration CRC value 721 is used to verify the configuration data in home configuration file 720. Finally, roaming configuration CRC value 731 is used to verify the configuration data in roaming configuration file 730.

Figure 8:
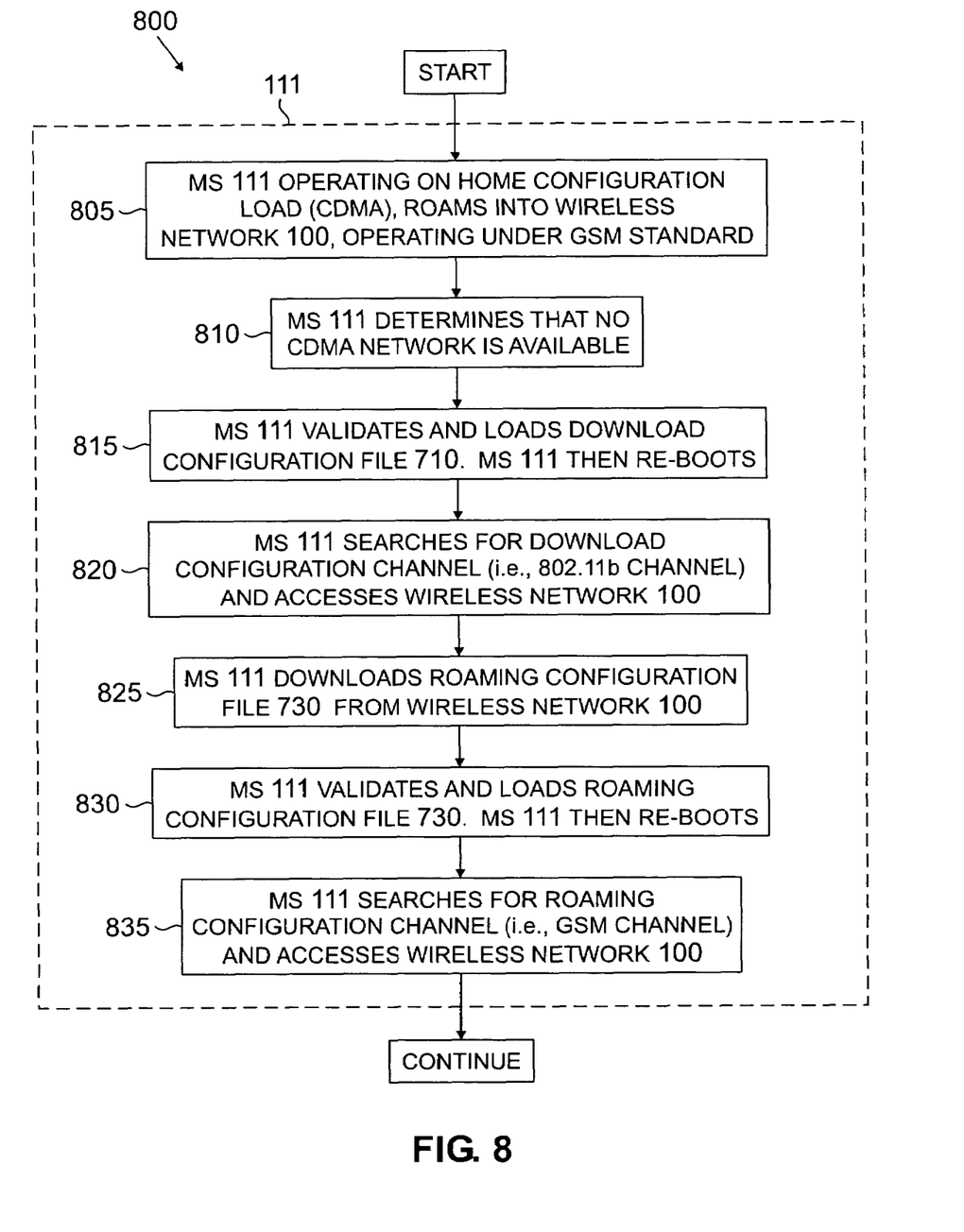
FIG. 8 is flow diagram illustrating the remote configuration of the multi-mode mobile station according to the principles of the present invention.

FIG. 8 depicts flow diagram 800, which illustrating the remote configuration of multi-mode mobile station (MS) 111 according to the principles of the present invention. Initially, multi-mode MS 111, operating on its home configuration load (i.e., CDMA), roams into wireless network 100, which is operating under the GSM standard in this example (process step 805). Multi-mode MS 111 determines that no CDMA network is available (process step 810). In response to that determination, multi-mode MS 111 validates and loads the configuration data from download configuration file 710. Multi-mode MS 111 then reboots (process step 815).

After reboot, multi-mode MS 111 searches for a download configuration channel (i.e., an IEEE-802.11b channel in this example) and accesses wireless network 100 (process step 820). Once an IEEE-802.11b download channel is established with wireless network 100, multi-mode MS 111 downloads roaming configuration file 730 (i.e., a GSM configuration file) from a central server associated with wireless network 100 (process step 825). When the download operation is complete, multi-mode MS 111 validates and loads roaming configuration file 730. Multi-mode MS 111 then reboots (process step 830). After reboot, multi-mode MS 111 searches for a roaming configuration channel (i.e., a GSM channel in this example) and accesses wireless network 100 (process step 835).

It is worth noting that the operator of wireless network 100 does not need to deploy the download channel technology (i.e., IEEE-802.11b access points) with the same probability of coverage as the GSM base stations. Multi-mode mobile station 111 only needs a reasonable probability of encountering the download channel deployment within a reasonable period of time given a general travel profile. Thus, while all base stations of wireless network 100 communicate according to the roaming network wireless standard (i.e., GSM), only some of the base stations of wireless network 100 need to be capable of communicating according to the download channel wireless standard (i.e., IEEE-802.11b).

After loading the roaming configuration file, multi-mode MS 111 contains a download configuration file (i.e., an IEEE-802.11b software load), a home configuration file (i.e., a CDMA software load), and a roaming configuration file (i.e., a GSM load). This enables multi-mode MS 111 to return rapidly to CDMA configuration when multi-mode MS 111 returns to its home network. It also provides for further configuration downloads if multi-mode MS 111 travels to a new region requiring a new air interface standard.

Although the present invention has been described with an exemplary embodiment, various changes and modifications may be suggested to one skilled in the art. It is intended that the present invention encompass such changes and modifications as fall within the scope of the appended claims.

What is claimed is:

1. A multi-mode mobile station comprising:
   reconfigurable transceiver circuitry capable of communicating with wireless networks operating under different air interface standards;
   a memory for storing at least a download configuration file and a home configuration file; and
   a main controller capable of configuring said reconfigurable transceiver circuitry to operate according to a home network wireless standard using home configuration data retrieved from said home configuration file, wherein said main controller is further capable of determining that a network operating according to said home network wireless standard cannot be found and wherein said main controller, in response to said determination, is further capable of configuring said reconfigurable transceiver circuitry to operate according to a download channel wireless standard using download configuration data retrieved from said download configuration file.

2. The multi-mode mobile station as set forth in claim 1, wherein said main controller is capable of validating said download configuration data.

3. The multi-mode mobile station as set forth in claim 2, wherein said main controller is further capable of establishing a download channel with a roaming wireless network capable of operating according to said download channel wireless standard.

4. The multi-mode mobile station as set forth in claim 3, wherein said main controller is further capable of downloading a roaming network configuration file over said download channel from said roaming wireless network.

5. The multi-mode mobile station as set forth in claim 4, wherein said main controller is further capable of configuring said reconfigurable transceiver circuitry to operate according to a roaming wireless standard using roaming configuration data retrieved from said downloaded roaming network configuration file.

6. The multi-mode mobile station as set forth in claim 5, wherein said main controller is capable of validating said roaming configuration data.

7. The multi-mode mobile station as set forth in claim 6, wherein said download channel wireless standard operates in unlicensed radio frequency spectrum.

8. The multi-mode mobile station as set forth in claim 7, wherein said download channel wireless standard is an IEEE-802.11 standard.

9. The multi-mode mobile station as set forth in claim 8, wherein each of said home network wireless standard and said roaming network wireless standard comprise one of: i) the WCDMA standard, ii) the CDMA standard, and iii) the GSM standard.

10. A method of operating a multi-mode mobile station comprising i) reconfigurable transceiver circuitry capable of communicating with wireless networks operating under different air interface standards; and ii) a memory for storing at least a download configuration file and a home configuration file, the method comprising the steps of:
  retrieving home configuration data from the home configuration file;
  configuring the reconfigurable transceiver circuitry to operate according to a home network wireless standard using the home configuration data retrieved from the home configuration file;
  determining that a network operating according to the home network wireless standard cannot be found;
  in response to the determination, retrieving download configuration data from the download configuration file; and
  configuring the reconfigurable transceiver circuitry to operate according to a download channel wireless standard using the download configuration data retrieved from the download configuration file.

11. The method as set forth in claim 10, further comprising the step of validating the download configuration data.

12. The method as set forth in claim 11, further comprising the step of establishing a download channel with a roaming wireless network capable of operating according to the download channel wireless standard.

13. The method as set forth in claim 12, further comprising the step of downloading a roaming network configuration file over the download channel from the roaming wireless network.

14. The method as set forth in claim 13, further comprising the step of configuring the reconfigurable transceiver circuitry to operate according to a roaming wireless standard using roaming configuration data retrieved from the downloaded roaming network configuration file.

15. The method as set forth in claim 14, further comprising the step of validating the roaming configuration data.

16. The method as set forth in claim 15, wherein the download channel wireless standard operates in unlicensed radio frequency spectrum.

17. The method as set forth in claim 16, wherein the download channel wireless standard is an IEEE-802.11 standard.

18. The method as set forth in claim 17, wherein each of the home network wireless standard and the roaming network wireless standard comprise one of: i) the WCDMA standard, ii) the CDMA standard, and iii) the GSM standard.

19. For use in a wireless network capable of communicating with mobile stations according to a first air interface standard, a method of configuring a first mobile station that is not capable of communicating according to the first air interface standard, the method comprising the steps of:
  establishing a download channel with the first mobile station according to a download channel wireless standard;
  transmitting to the first mobile station in the download channel a configuration file capable of enabling the first mobile station to operate according to the first air interface standard using configuration data in the configuration file; and
  communicating with the first mobile station according to the first air interface standard.

20. The method as set forth in claim 19, wherein the download channel wireless standard operates in unlicensed radio frequency spectrum.

* * * * *